G. A. KEENE.
Carriage Steps.

No. 134,291.            Patented Dec. 24, 1872.

Witnesses.
S. N. Piper.
L. N. Möller.

George A. Keene.
by his attorney.
R. K. Eddy

UNITED STATES PATENT OFFICE.

GEORGE A. KEENE, OF LYNN, ASSIGNOR TO HIMSELF AND FRANCIS A. SAWYER, 2D, OF BOSTON, MASSACHUSETTS.

IMPROVEMENT IN CARRIAGE-STEPS.

Specification forming part of Letters Patent No. 134,291, dated December 24, 1872.

CASE B.

*To all whom it may concern:*

Be it known that I, GEORGE A. KEENE, of Lynn, of the county of Essex and State of Massachusetts, have invented an Improved Elastic Tread or Cap for Steps; and do hereby declare the same to be fully described in the following specification and represented in the accompanying drawing, of which—

Figure 1:
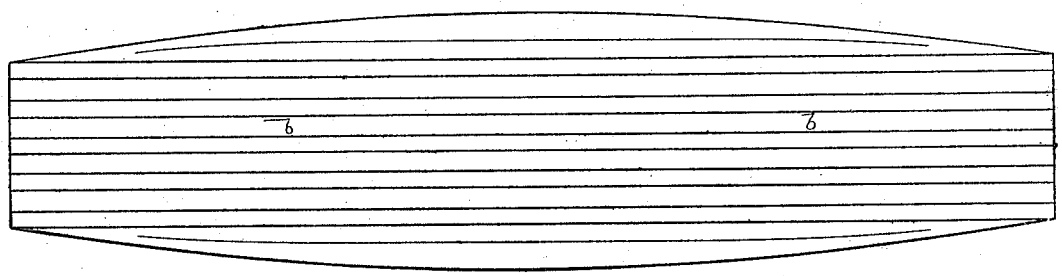
Figure 2:
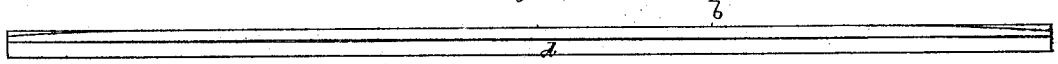
Figure 3:

Figure 1 is a top view, Fig. 2 a front elevation, and Fig. 3 a transverse section, of it.

In carrying out my invention, I take a metallic plate, $a$, of the proper shape, and cover it on opposite sides with layers $b$ $c$ of vulcanizable rubber or gutta-percha, and I extend such rubber, in the form of a flange or lip, $d$, down from one edge of the plate or tread; furthermore, I cover the under layer $c$ of vulcanizable rubber or gutta-percha with a layer or stratum, $e$, of canvas, or its equivalent, which I also extend down along the inner side of the flange or lip to the lower edge thereof. The edges of the metallic plate are to be covered by the layers of rubber being made to project beyond such and to unite together, after which the whole is to be vulcanized or subjected to the heat necessary to vulcanize the rubber, the canvas being pressed upon and adhering strongly to the inferior layer of rubber.

The flange, when the tread is in use, is to extend down against the front edge of step or stair in order to make a better finish to prevent water from working in between the tread and the step, and also to protect the edge of the tread from wear and injury. The extension of the canvas down against the lip greatly strengthens the latter and affords a means of preventing the lip from tearing away from the tacks or nails used in fixing it in place on the step. The canvas when applied and fixed both to the tread and the lip, as described, serves as a means of facilitating the fixation of the tread and flange to a step by means of glue or cement, which will adhere to the canvas when it will not to the layer of rubber.

I claim—

The elastic tread made and provided with the lip or flange, substantially as described.

GEO. A. KEENE.

Witnesses:
R. H. EDDY,
J. R. SNOW.